A. TURNBULL.
RESILIENT WHEEL.
APPLICATION FILED MAY 27, 1920.
1,393,651. Patented Oct. 11, 1921.
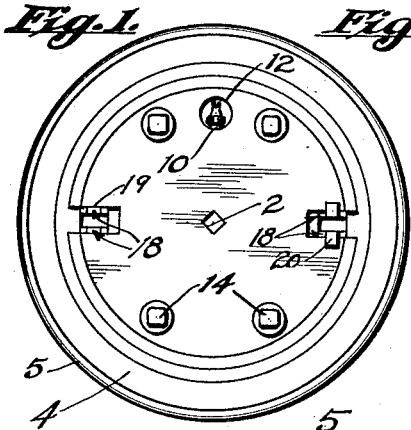
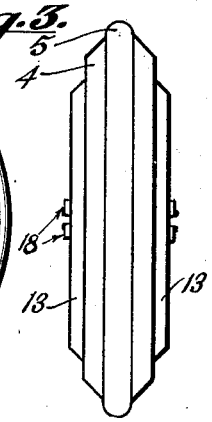
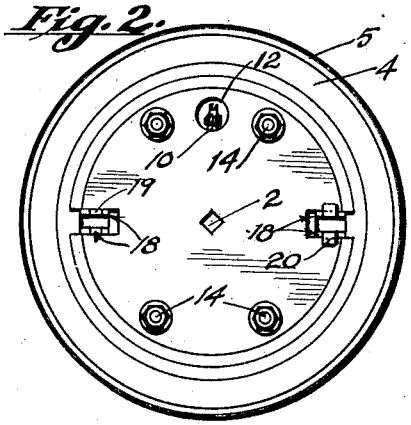
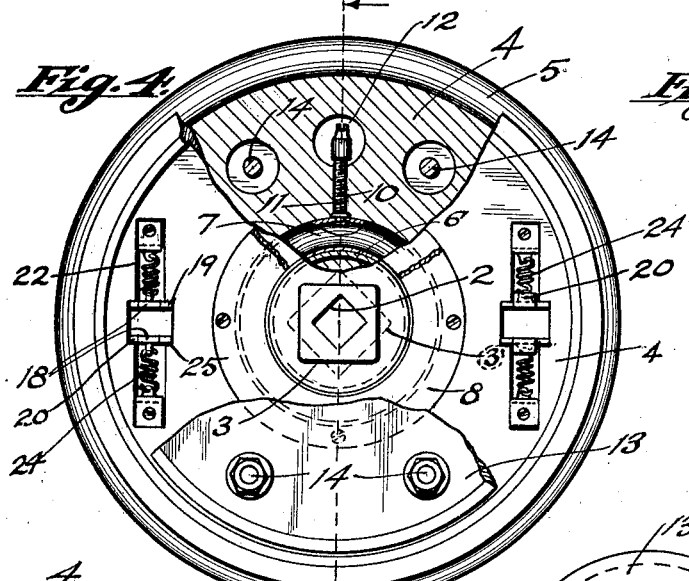
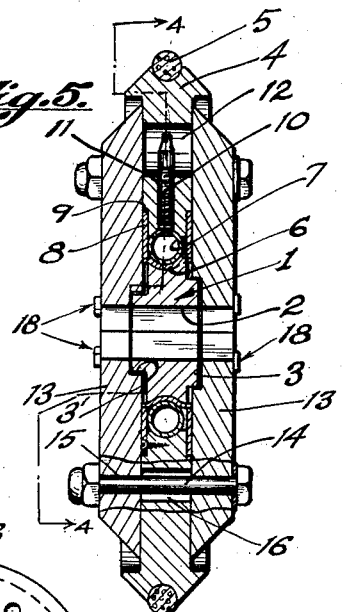
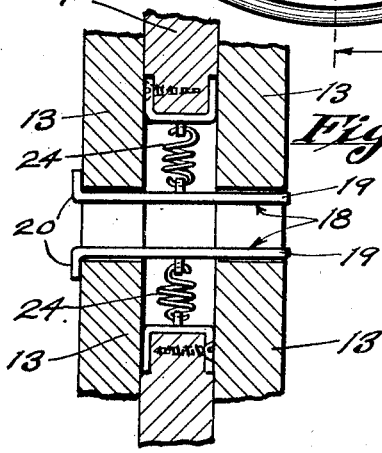
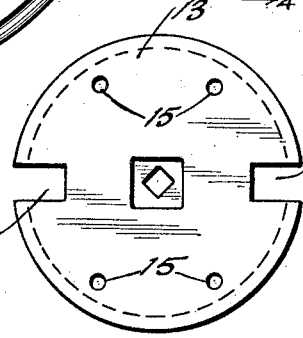
Inventor
Andrew Turnbull
By Hazard & Miller
Attorneys

UNITED STATES PATENT OFFICE.

ANDREW TURNBULL, OF SANTA ANA, CALIFORNIA.

RESILIENT WHEEL.

1,393,651. Specification of Letters Patent. Patented Oct. 11, 1921.

Application filed May 27, 1920. Serial No. 384,698.

*To all whom it may concern:*

Be it known that I, ANDREW TURNBULL, a citizen of the United States, residing at Santa Ana, in the county of Orange and State of California, have invented new and useful Improvements in Resilient Wheels, of which the following is a specification.

This invention is a resilient wheel and has for its object the provision of a construction in which the desired resiliency is obtained in a wheel without employing a pneumatic tire at the tread of the wheel.

This invention will be readily understood from the following description of the accompanying drawings, in which—

Figure 1 is a side elevation of the wheel.

Fig. 2 is a side elevation of the opposite side of the wheel.

Fig. 3 is an edge view of the wheel.

Fig. 4 is a section on the line 4—4 of Fig. 5.

Fig. 5 is a transverse section on the line 5—5 of Fig. 4.

Fig. 6 is a detail transverse section through the driving connection between the hub of the wheel and the tread portion thereof.

Fig. 7 is a detail side elevation of one of the side plates of the wheel.

The improved wheel consists essentially of a hub portion which may be fixed to an axle, a tread portion spaced radially beyond the hub portion, cushioning means between the hub portion and the tread portion shown as a pneumatic tire and side plates fixed for rotation with the hub portion of the wheel and having yielding driving connections with the tread portion of the wheel.

Referring to the particular embodiment of the invention illustrated, the hub portion of the wheel is shown at 1 as having a squared axle opening 2 and angularly disposed squared end portions 3 upon said hub. This hub may be fixed upon an axle for rotation therewith in any suitable manner.

The tread portion of the wheel is shown as an annular member 4 surrounding the hub in spaced radial relation beyond the hub. A tire 5 shown as a solid rubber tire may be provided at the tread of this tread portion of the wheel. A wearing ring 6, preferably, surrounds the hub of the wheel, and a pneumatic tire 7 rests upon this wearing ring and is received within the space between the ring and the tread portion of the wheel, so as to form a resilient cushion for tread portion relative to the hub. Wearing rings 8 may be provided at the respective sides of the tire 7, these wearing rings being received in suitable recesses 9 in the faces of the tread portion of the wheel. The tire 7 is provided with a usual valve stem 10, projecting through a radial opening 11 in the tread portion of the wheel into a transverse opening 12 extending through the tread portion of the wheel.

Side plates 13 are received against the opposite faces of the wheel as thus constructed, these side plates being suitably secured to the tread portion of the wheel as by bolts 14 extending transversely through the wheel and received in suitable transverse openings 15 extending through the side plates and transverse openings 16 provided in the tread portion of the wheel. The openings 16 are shown as of somewhat greater diameter than the bolts 14 to permit of relative movement between the side plates and the tread portion of the wheel. The side plates are fixed relative to the hub portion of the wheel as by providing recesses 3' in the inner surfaces of said side plates, these recesses being arranged to receive the squared end portions 3 of the hub. By this arrangement the side plates are caused to rotate with the hub of the wheel.

The yielding driving connection provided between the side plates 13 and the tread portion of the wheel may comprise fingers 18 extending through the tread portion of the wheel, a pair of said fingers being, preferably, provided at diametrically opposite sides of the tread portion of the wheel. The fingers 18 are shown as extending beyond the opposite outer surfaces of side plates 13, and each pair of fingers are, preferably, provided with straight ends 19 at one end thereof, and with hook ends 20 at the opposite end of the pair of fingers. The hooked ends of the respective pairs of fingers are, preferably, arranged at the opposite surfaces of the wheel. The pairs of fingers 18 are shown as received in elongated slots 22 extending through the tread portion of the wheel and in elongated notches 23, provided in the side plates 13. The fingers of a pair are yieldably drawn away from one another as by springs 24 connected to the respective fingers and to the respective ends of the slots 22. The movement of the fingers away from one another may be limited by shoulders 25 provided in slots 22 and engaging the respective fingers of a pair.

From the construction as thus described, it will be seen that when the hub portion of the wheel is rotating, the side plates 13 fixed thereto by bolts 14 will also be rotated and the walls of notches 23 will engage fingers 18 to form a driving connection between the side plates and the tread portion of the wheel. The fingers 18 are arranged to yield against the tension of springs 24 when first engaged by the side plates 13 to absorb the shock incident to the driving connection thus formed between the side plates and tread portion of the wheel. Furthermore, it will be observed that the construction thus provided obtains the desired resiliency in a wheel by the employment of a pneumatic tire, this tire, however, being out of contact with the road engaged by the tread of the tire, so as to eliminate the excessive wear upon the tire that is always present in the usual wheel provided with a pneumatic tire at its tread.

It will be apparent that various changes may be made in the construction as thus described without departing from the spirit of the invention.

What is claimed is:

1. A resilient wheel comprising a hub portion; cushioning means surrounding said hub portion; a tread portion surrounding said cushioning means; side plates fixed relative to said hub portion and received against the sides of said tread portion; said tread portion having slots therein; and transversely spaced fingers extending through said slots and engaged by said side plates for movement relative to one another and yieldable connections between said fingers and said tread portion urging said fingers away from one another in said slots.

2. A resilient wheel comprising a hub portion; cushioning means surrounding said hub portion; a tread portion surrounding said cushioning means; side plates fixed relative to said hub portion and received against the sides of said tread portion; said tread portion and said side plates having coöperating slots therein; fingers extending through said slots and engaged by said side plates, and spring connections between said fingers and said tread portion.

3. A resilient wheel comprising a hub portion; cushioning means surrounding said hub portion; a tread portion surrounding said cushioning means; side plates fixed relative to said hub portion and received against the sides of said tread portion; and transversely spaced fingers received in slots of said side plates and movable relative to one another and to said tread portion, and yieldable connections between said fingers and said tread portion urging said fingers away from one another in said slots.

4. A resilient wheel comprising a hub portion; cushioning means surrounding said hub portion; a tread portion surrounding said cushioning means; side plates fixed relative to said hub portion and received against the sides of said tread portion; said tread portion and said side plates having coöperating slots; fingers extending through said slots and yieldable connections between said fingers and said tread portion urging said fingers away from one another in said slots.

In testimony whereof I have signed my name to this specification.

ANDREW TURNBULL.